United States Patent
Deierling et al.

(10) Patent No.: US 8,484,486 B2
(45) Date of Patent: Jul. 9, 2013

(54) INTEGRATED CRYPTOGRAPHIC SECURITY MODULE FOR A NETWORK NODE

(75) Inventors: Kevin Deierling, Pescadero, CA (US); Raj Vaswani, Portola Valley, CA (US); Alexander Gostrer, Sunnyvale, CA (US); Aditi Dubey, Redwood City, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 589 days.

(21) Appl. No.: 12/493,707

(22) Filed: Jun. 29, 2009

(65) Prior Publication Data

US 2010/0037069 A1     Feb. 11, 2010

Related U.S. Application Data

(60) Provisional application No. 61/136,023, filed on Aug. 6, 2008.

(51) Int. Cl.
*G06F 11/30*     (2006.01)

(52) U.S. Cl.
USPC .......................................... 713/193; 713/189

(58) Field of Classification Search
USPC .............. 713/164–167, 189, 192–193; 726/2, 726/16, 26–30; 380/277–280
See application file for complete search history.

(56) References Cited

U.S. PATENT DOCUMENTS

| | | | |
|---|---|---|---|
| 4,924,515 A | 5/1990 | Matyas et al. | |
| 5,533,125 A * | 7/1996 | Bensimon et al. | 711/163 |
| 6,111,953 A | 8/2000 | Walker et al. | |
| 6,820,203 B1 * | 11/2004 | Okaue et al. | 713/193 |
| 6,986,052 B1 * | 1/2006 | Mittal | 713/190 |
| 2002/0007456 A1 * | 1/2002 | Peinado et al. | 713/164 |
| 2002/0073316 A1 * | 6/2002 | Collins et al. | 713/174 |
| 2002/0191793 A1 * | 12/2002 | Anand et al. | 380/255 |
| 2005/0091491 A1 * | 4/2005 | Lee et al. | 713/167 |
| 2005/0210287 A1 * | 9/2005 | Paatero | 713/201 |
| 2005/0278549 A1 | 12/2005 | Torla et al. | |
| 2006/0090084 A1 * | 4/2006 | Buer | 713/189 |
| 2006/0107032 A1 | 5/2006 | Paaske et al. | |
| 2006/0117177 A1 | 6/2006 | Buer | |
| 2007/0237325 A1 * | 10/2007 | Gershowitz et al. | 380/30 |
| 2008/0016349 A1 | 1/2008 | Kahn | |
| 2008/0181399 A1 | 7/2008 | Weise et al. | |
| 2009/0083520 A1 * | 3/2009 | Kanemura | 712/43 |

(Continued)

FOREIGN PATENT DOCUMENTS

WO    WO 01/29652    4/2001

OTHER PUBLICATIONS

U.S. Appl. No. 61/055,980.*
U.S. Appl. No. 61/063,925.*

(Continued)

*Primary Examiner* — Darren B Schwartz
(74) *Attorney, Agent, or Firm* — Buchanan Ingersoll & Rooney PC

(57) ABSTRACT

A system that provides a cryptographic unit that generates secret keys that are not directly accessible to software executed by a controller. The cryptographic unit can include a restrictor device, a finite state machine, a random number generator communicatively and a memory. The memory stores values generated by the random number generator. The restrictor device and the finite state machine include hardware logic that restricts access or changes to the contents of the memory.

17 Claims, 6 Drawing Sheets

U.S. PATENT DOCUMENTS

2009/0204823 A1* 8/2009 Giordano et al. ............. 713/190
2009/0205053 A1* 8/2009 Sriram et al. .................. 726/30
2009/0290712 A1* 11/2009 Henry et al. .................. 380/277

OTHER PUBLICATIONS

U.S. Appl. No. 61/055,980, filed May 24, 2008.*
U.S. Appl. No. 61/063,925, filed Feb. 7, 2008.*
Notification of Transmittal of the International Search Report (Form PCT/ISA/220 and PCT/ISA/210) and the Written Opinion of the International Searching Authority (Form PTO/ISA/237) issued in the corresponding international Application No. PCT/US2009/004435 dated May 19, 2011.
"An Overview of Secret Key and Identity Management for System-on-Chip Architects", White Paper, Secret Key and Identity Management, Elliptic Semiconductor, Inc., 2007, pp. 1-8.
White Paper, Crypto Offload Options, Elliptic Semiconductor, Inc., pp. 1-5, May 2008.
CILP46, SPAcc 3.0 Offload Engine, Product Brief, Elliptic Semiconductor, Inc., 2009, pp. 1-7.
Charles Buenzli, "Consider OTP Memory for IC Antipiracy", EE Times, Feb. 26, 2007.
An English Translation of Office Action from the Taiwan Intellectual Property Office (TIPO) dated Apr. 15, 2013, issued in corresponding Taiwanese Patent Application No. 098126164.

* cited by examiner

(12) United States Patent
US 8,484,486 B2

INTEGRATED CRYPTOGRAPHIC SECURITY MODULE FOR A NETWORK NODE

CROSS-REFERENCE TO RELATED PATENT APPLICATIONS

This application claims the benefit of priority to U.S. Provisional Patent Application 61/136,023, filed on Aug. 6, 2008, the entire disclosure of which is hereby incorporated by reference into this specification.

FIELD

The disclosed embodiments are directed toward devices providing cryptographic security.

BACKGROUND

A variety of cryptographic security techniques have been developed to protect private information. These include both symmetric and asymmetric key encryption techniques. Secret keys are used in both of these methods. As such, protecting secret keys is paramount to controlling access to private information.

In devices that process encrypted information, a separate hardware security module ensures that secret keys and other information is not accessible by the applications executed by a device's main processor. In some devices, information is protected by a hardware security module that is incorporated into a cryptographic co-processor separate from the main processor. Alternatively, the information may be protected stored in a dedicated area in memory accessible by a separate data bus that physically and/or functionally isolates the memory area from a device's main processor.

For example, U.S. Patent Application Publication No. 2008/0016349 discloses an apparatus having secret information embedded in a nonvolatile memory. The nonvolatile memory is isolated such that access to the information is limited to a fixed state custom logic block. This block has hardware configured to use a hidden number and other information to provide an output that is a function of the hidden number and that can be used to confirm an identity of a device without revealing the secret information.

In addition, U.S. Patent Application Publication No. 2008/0181399 discloses a composite hardware security module and cryptographic accelerator device. The hardware security module generates and securely stores cryptographic keys. The cryptographic keys generated are managed entirely within the composite device. Once generated, cryptographic keys may be stored either within the device or outside the device in an encrypted form. A master key, which is used to encrypt the cryptographic keys before exporting them out of the device, remains in the device at all times and is isolated on a separate data bus. Clear text versions of the cryptographic keys are not accessible outside of the device.

SUMMARY

Embodiments disclosed herein providing a cryptographic processing system having a hardware accelerator and a memory device without using a separate co-processor or data bus. In an exemplary embodiment, the system comprises a processor and a cryptographic unit. The cryptographic unit includes a cryptographic accelerator device, a restrictor device, a cryptographic state machine, a random number generator and a non-volatile memory device. The random number generator generates unique, cryptographic keys that are stored in the non-volatile memory and accessed by the cryptographic accelerator. The restrictor device prevents access to the information stored in the non-volatile memory by the controller based on information describing a requested cryptographic operation. The cryptographic state machine is comprised of hardware logic that prevents the controller from directly changing or accessing the information stored in the non-volatile memory.

DETAILED DESCRIPTION

Figure 1:
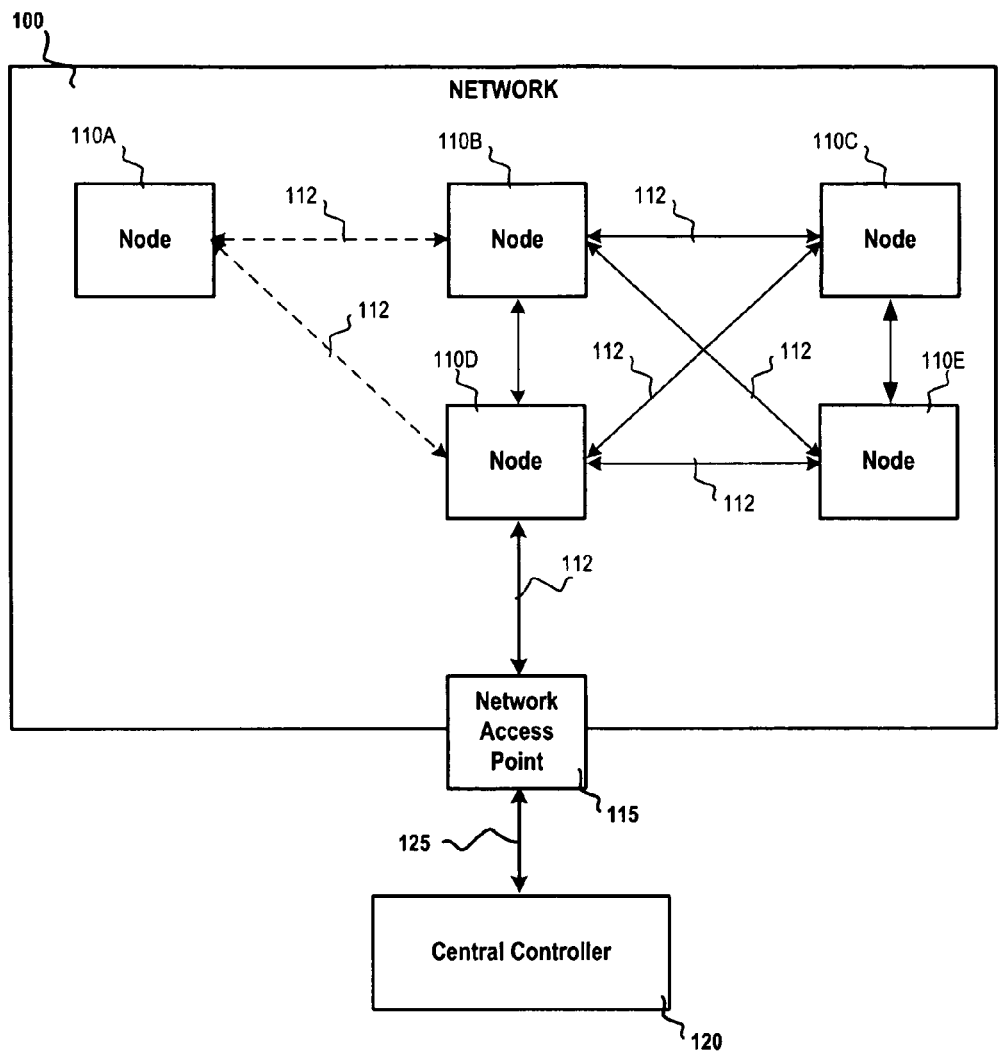
FIG. 1 is a block diagram illustrating an exemplary network system including a number of nodes.

FIG. 1 is a block diagram illustrating an example of a network 100 having a plurality of nodes 110 connected by communications links 112. Network 100 may be any type of network including, for instance, a cable television network, satellite communications network, sensor network, or an ad-hoc wireless communications network. Network 100 can also be connected to another network, contain one or more other sub-networks, and/or be a sub-network within another network.

Communication links 112 between nodes 110 can be wired, fixed wireless, mobile wireless links using a variety of communication protocols. For instance, information can be transmitted over communications links 112 within data packets according to packet-switching protocols, such as Transaction Control Protocol (TCP)/Internet Protocol (IP), X.25, and Frame Relay.

Nodes 110 can be any programmable data processing devices connected to network 100. For example, a node 110 can be a general-purpose computer, server, a network device (e.g., gateway, terminal, switch, repeater, router), or application-specific device (e.g., residential utility meter, remote sensor, set-top box, game device, mobile telephone). The network illustrated in FIG. 1 is a simplified example having only a few generic nodes 110. However, other networks having different numbers and types of nodes in different configurations may benefit from embodiments of this disclosure.

In an exemplary embodiment, network 100 can be a wireless smart-grid network that monitors and controls an electrical power generation and distribution service. As shown in FIG. 1, a node 110 may establish communication links 112 with other nodes 110 within its transmission range. A node may exchange information with a destination node by relaying the information over a series of intervening nodes in network 100 (or a combination of networks). For instance, node 110A may wirelessly transmit information recorded by a residential utility meter by relaying the information to a network access point 115, which then forwards the information to a central controller 120 over a wide area network 125 (e.g., the Internet).

The exemplary smart-grid network may be self-organizing such that nodes 110 join network 100 with limited or no communication to central controller 120 that might otherwise authenticate and/or admit a node to the network. As such, the nodes themselves may be required to ensure the security of network 100. For instance, if a new node, such as node 110A attempts to join network 100, the node may be required to provide sufficient credentials to neighboring nodes 110B & 110D that are members of network 100. By authenticating credentials between nodes 110, third parties (malicious, unscrupulous or otherwise) can be prevented from adding unauthorized nodes to the network.

Figure 2:
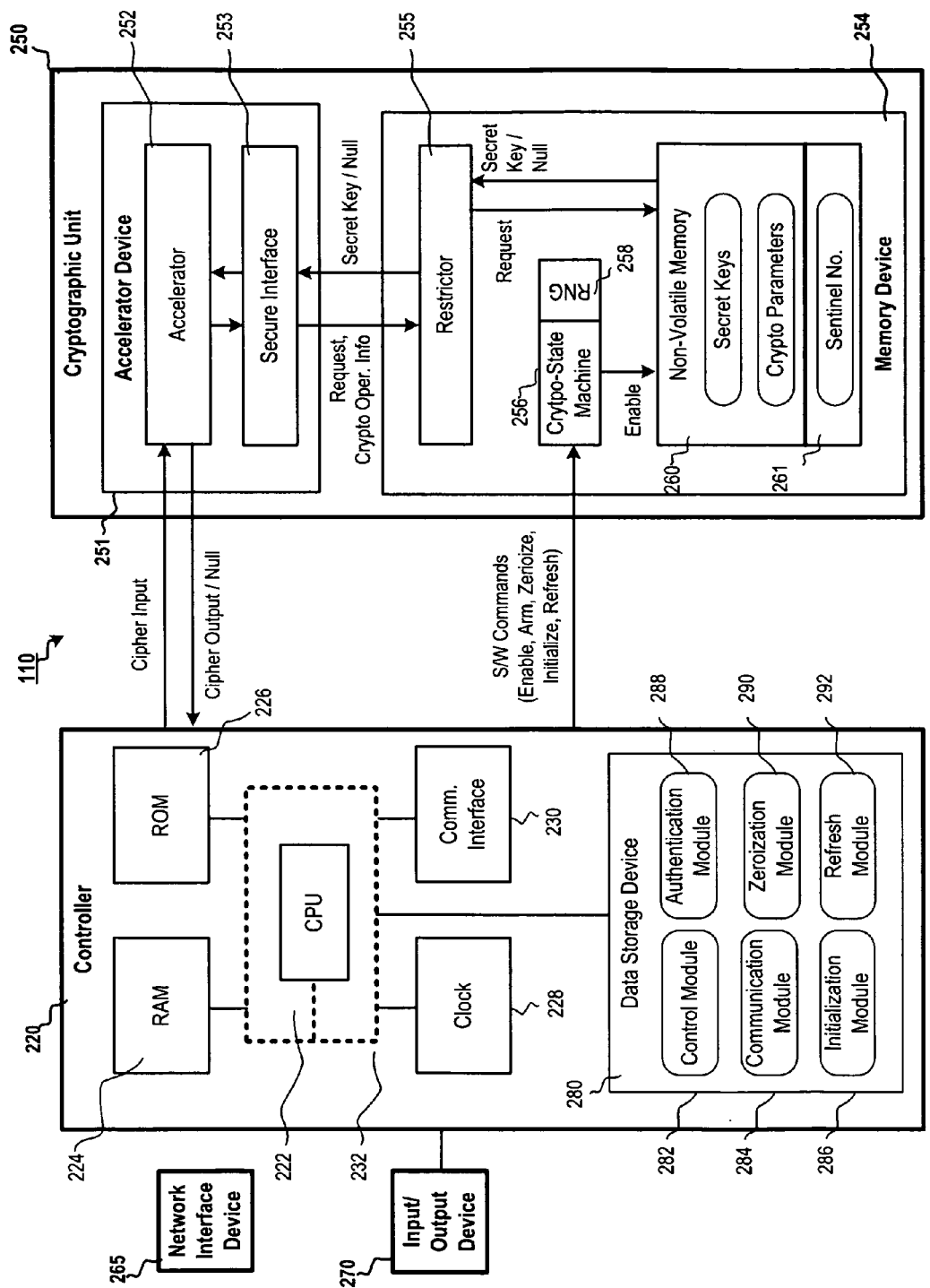
FIG. 2 is a block diagram illustrating a node in the exemplary system.

FIG. 2 illustrates an exemplary system including a controller 220 and cryptographic unit 250. For the purposes of illustration, the system is discussed below as being embodied within a node 110. However, the system is not limited to such embodiments. For instance controller 220 can be a computer that is communicatively linked to cryptographic unit 250 over a local or wide-area network.

As illustrated in FIG. 2, exemplary node 110 includes a controller 220 communicatively linked to a cryptographic unit 250, a network interface device 265, a data input/output device 270, and a data storage device 280. Controller 220 can have a central processing unit ("CPU") 222 communicatively linked to a random access memory ("RAM") 224, a read-only memory ("ROM") 226, clock 228, a communication interface 230 (e.g., serial, parallel, wireless, etc.), a data bus 232 and a data storage device 280. CPU 222 is an electronic data processing device that executes program instructions recorded in computer-readable memory devices (e.g., RAM 224, ROM 226 or data storage device 280). CPU 222 may be a general-purpose processor (e.g., INTEL), or a specialized, embedded processor (e.g., ARM).

Data storage device 280 may be one or more non-volatile recording devices that hold computer-readable program instructions and data. Data storage device may be, for instance, a semiconductor, magnetic or optical-based information storage/retrieval device (e.g., flash memory, hard disk drive, CD-ROM, flash RAM). As shown in FIG. 2, software modules 282-292 can be stored in data storage device 280. The software modules are comprised of computer-executable instructions that can be executed by CPU 222 to control node 110 and its components to perform various methods, processes, and/or functions, including those disclosed herein.

Control module 282 may be one or more software routines that, when executed by CPU 222, manage activities and resources of node 110, such as providing an interface between software modules and/or the hardware devices in the node 110. For instance, control module 282 may be an operating system responsible for allocating portions of memory, such as RAM 224, to different software modules, handling hardware interrupts, and controlling access to data bus 232.

Communication module 284 may be one or more software routines that, when executed by CPU 222, control node 10's communications via communications interface 230 and/or network interface device 160. Communications module 284 may, for instance include instructions for encoding and decoding information into different communication protocols, such as TCP/IP.

Initialization module 286 can be one or more software routines that, when executed by CPU 222, triggers an initialization function of cryptographic unit 250. Initialization module 286 can, for example, respond to a command received from communication module 284 to trigger the cryptographic unit 250 by sending a message over data bus 232 that sets a predetermined data bit of cryptographic unit 250. In one instance, setting the predetermined data bit comprises switching a voltage supplied to a particular pin of non-volatile memory 260 from a digital low-level to a high-level. Such an initialization trigger command may be sent, for example, from initialization module 286 in response to a command provided from another node 110 or central controller 220, which is received via network interface device 265, or provided from an operator via an input device 270.

Authentication module 288 may be one or more software routines that, when executed by CPU 222, requests processing of encrypted information by cryptographic unit 250. Authentication module 288 exchanges information with cryptographic unit 250, which performs operations for one or more cryptographic encryption/decryption algorithms (e.g., SHA-256, AES-256, RSA-2048, and ECC-256). For instance, based on a cryptographic algorithm executed by authentication module 288, controller 220 may provide a request to encrypt or decrypt an input using a specified type of encryption algorithm based on key of a particular size.

For instance, node 110A may receive a message transmitted wirelessly from another node 110B at network interface device 265. Network interface device 265 may demodulate the message from the received signal and provide the message to communication module 284. Communication module 284 may decode and/or de-packetize the message using the appropriate protocol and pass the information from the message to the authentication module 288 for cryptographic processing. Authentication module 286 carries-out a cryptographic algorithm to decrypt the message using as 128-bit AES operation. Operations of the algorithm are performed by making requests to the cryptographic unit 250 to perform operations in the algorithm using a secret key. After the message is decrypted by cryptographic unit 250, authentication module 286 can pass back a response to communication module 284 for transmission to the other node 110 via network interface device 265.

Zeroization module 290 can be one or more software routines that, when executed by CPU 222, triggers a zeroization function of cryptographic unit 250. Zeroization module 290 can, for example, respond to a command received from communication module 284 to trigger non-volatile memory 260 to assume an uninitialized state in which the memory must store secret keys before cryptographic unit 250 can operate. The trigger may be sending a message over data bus 232 that sets a predetermined data bit of non-volatile memory 260. Such a zeroization trigger command may be sent from zeroization module 290 in response to a command provided from another node 110 or central controller 220, which is received via network interface device 265; or provided from an operator over an input device 270.

Refresh module 292 can be one or more software routines that, when executed by CPU 222, triggers a refresh function of non-volatile memory 260, in which its secret keys are re-stored. Refreshing the secret keys helps extend the life of a node by avoiding loss of its keys over time due to being corrupted by, for example, bit rot. When invoked, refresh module 192 can respond to a command received from comunication module 284 to trigger the non-volatile memory 260. The trigger may be for example, sending a message over data bus 232 that sets a predetermined data bit in non-volatile memory 260. This refresh trigger command may be sent from refresh module 292 in response to a command provided from another node 110 or central controller 220, which is received via network interface device 265, provided from an operator over an input device, or automatically provided based on detection of tampering by a sensor.

Although modules 282-292 are described above as individual modules, the functions of these modules can be combined into a single module or further divided among several sub-modules. In addition, the functions of the above-described software modules can be implemented in hardware logic, as well as in a combination of hardware logic device and software.

Network interface device 265 exchanges information with controller 220 to encode and decode messages transmitted over communication link 112. For instance, network interface device 265 may receive a message from controller 220 and convert the information into data packets for transmission over communication link 112 according to the TCP/IP data transmission protocol. Likewise, network interface 260 device may receive TCP/IP data packets from another one of nodes 110 over communication link 115 and reassemble the packets into a message before providing the information to controller 220. Operating parameters used to configure and control network interface device 265 may be stored in the node's computer-readable data recording devices, such as RAM 224, ROM 226 or data storage device 280.

Data input/output device 270 may be one or more devices that exchange data with controller 220, either directly or indirectly via, for example, communications interface 230. The devices can be incorporated-in or peripheral-to node 110. Data input/output device 270 can include, for example, a user input device, a display device, an audio device, a sensor, a data-capture device and a communication device.

Cryptographic unit 250 protects and isolates private information from being accessed by controller 220 or some other device that is external to the unit by establishing a secure perimeter through which only has limited access is permitted. The private information can include, for instance, secret keys and cryptographic parameters. Secret keys are unique, randomly generated values. Cryptographic parameters are stored values that are referenced by a cryptographic algorithm.

Cryptographic unit 250 is communicatively linked to controller 220, either directly or indirectly. In the exemplary embodiment shown in FIG. 2, cryptographic unit 250 is directly attached to controller 220 within node 110. However, in some embodiments, controller 220 may access cryptographic unit 250 via some interface in node 110 that, for example, conditions, formats and/or maps data exchanged between controller 220 and cryptographic unit 250. In other embodiments, cryptographic unit 250 is a stand-alone device that connects with controller 220 over a direct or indirect communication link.

As shown in FIG. 2, controller 220 may provide cryptographic module 220 a cipher input, for instance from authentication module 290, requesting that cryptographic algorithm be applied to information included in the input. In response, cryptographic unit 250 may return either a cipher output or a null response based on the propriety of the request and the state of memory device 254. Additionally, controller 220 may provide software commands (e.g., enable, arm, zeroize, refresh) to memory device 254. These commands may affect the state of memory device 254, however, the commands do no enable controller 220 to access the contents of memory device 254.

Cryptographic unit 250 has an accelerator device 251 and a memory device 254. Accelerator device 251 includes an accelerator 252 and a secure interface 253. Accelerator 252 has one or more hardware logic devices that execute both low-level and high-level cryptographic operations ranging from large integer point operations, Montgomery exponentiation, and modular arithmetic to ECDSA (Elliptic Curve Digital Signature Algorithms), Elliptic Curve over prime fields, HMAC-SHA1 and other high-level functions etc. Because cryptographic algorithms are computationally intensive, offloading the work of computing the algorithms from processor 220 to cryptographic accelerator 252 can accelerate cryptographic operations by reducing the burden on controller 220. In some embodiments, accelerator 252 can be a Symmetric/Asymmetric Performance Accelerator (SASPA) designed and built by Elliptic Semiconductor, Inc. of Ottawa, Canada.

Secure interface 253 links controller 220 and/or accelerator 252 to memory device 254. Amongst other information, secure interface 253 provides memory device 254 with information about a cryptographic operation being executed. For instance, secure interface 253 may indicate that cryptographic accelerator 252 is performing an AES encryption algorithm. Alternatively or additionally, secure interface 253 may indicate the size of the key being used in the current encryption algorithm. Based on the information provided via secure cryptographic interface 254, memory device 254 may restrict access to some or all of the information recorded in its memory.

Memory device 254 includes restrictor 255, cryptographic state machine 256, random number generator 258, and non-volatile memory 260, which interact to ensure information stored in non-volatile memory 260 is secure. Restrictor 255 is a device including hardware logic that limits access to crypto-memory device by applications executed by controller 220 or other processing devices external to the cryptographic unit 250. Restrictor 255 effectively establishes the secure perimeter that separates untrusted devices and processes, such as those executed by controller 220, from accessing operations performed by cryptographic state machine 256 or the information stored in non-volatile memory 260.

For instance, a malicious attacker might modify firmware for controller 220 stored in ROM 226 such that controller 220 accesses secret keys to create unauthorized signatures. Because controller 220 cannot be trusted, restrictor 255 establishes a secure perimeter that separates controller 220 from cryptographic unit 250. Based on the security perimeter established by restrictor 255, untrusted software executed by controller 220 can request operations necessary to implement protocols of complex cryptographic algorithms, such as AES, DES, and Elliptic Curve Key. This allows the protocols to be modified and updated over time without reducing the security of information stored in memory 260.

Restrictor 255 can include a sequence restrictor and/or an operation restrictor. The sequence restrictor prevents access to cryptographic unit 250 when a cryptographic operation in being performed. This restriction prevents processes executed in controller 220 (or other device) from accessing intermediate data generated during operations of cryptographic state machine 256 that might be used to deduce secret keys.

Operations restrictor limits controller 220's (or other device's) access to information within non-volatile memory 260 by enforcing matching between a cryptographic operation and the information (keys/parameters) on which the operation is being performed. A cryptographic operation will fail if an operation executed by controller 220 or crypto-accelerator 252 does not match the requested information. Restrictor 255 may receive information about key size of the cryptographic operation being performing: (e.g., 128 bit, 192 bit, or 256 bit). Additionally or alternatively, restrictor 255 may receive information about the type of operation being performed (e.g., AES, Elliptic Curve Point Multiplication used in ECDSA etc). Restrictor 255 can use such information to enforce access control of non-volatile memory 260 by determining whether a one or both of algorithm-type and key size are valid and enable access a memory location holding the corresponding keys and/or parameters. For example, restrictor 255 may prevent a memory location having an EC-type key from being accessed during an AES-type cryptographic operation. Also, non-volatile memory 260 can restrict access to a memory location storing a 256-bit key when a 384 bit cryptographic operation is being performed. Other parameters, types and combinations thereof can be used to limit access to information in non-volatile memory 260.

Cryptographic state machine 256 is a digital logic device having a limited number of states, transitions between those states, and actions. Cryptographic state machine 256 may controlled by digital circuit comprised of programmable logic devices, programmable logic controllers, data registers, logic gates and flip flops, for example. Cryptographic state machine 256 prevents controller 220 and its processes (e.g., modules 286-292) from directly accessing non-volatile memory 260. Instead software modules 286-292 control cryptographic state machine 256 to initialize non-volatile memory 260 with secret key data and convert it from a read/write memory to a read-only memory. In order for the non-volatile memory 260 to perform certain functions the state machine must be in the "good" state. Otherwise, non-volatile memory 260 outputs incorrect information (e.g., all zeros.) Based on this, private information is protected from being accessed and monitored.

Cryptographic state machine 256 responds to a limited set of software commands from processor 220. These commands, however, only affect cryptographic state machine 256 and do not provide processor 220 or cryptographic interface device 251 direct access to memory 260. The commands can only trigger cryptographic state machine 256 to perform enable, initialization, refresh and zeroization functions. Other than that, controller 220 or cryptographic accelerator 252 is unable to control the cryptographic state machine 256 and it operates entirely autonomously based on internal hardware states and signals.

Random number generator ("RNG") 258 is communicatively linked to cryptographic state machine 258. RNG 258 can be hardware or software that generates random numbers. In some embodiments RNG 258 can be a digital logic device that is controlled based on signals received from cryptographic state machine 256 to generate unique secret keys that are stored in non-volatile memory 260.

Non-volatile memory 260 stores private information, such as, secret keys and elliptic curve parameters, used in cryptographic operations. Parameters can, for example, be used in elliptic curve encryption algorithms. A "sentinel number" has a value stored at a predetermined location within non-volatile memory 260. The sentinel number can be used by non-volatile memory 260 in performing the digital logic associated with the above-described zeroization, initialization and refresh functions. Further, the sentinel number controls the state of cryptographic state machine 254 to reversibly convert the function of non-volatile memory 260 from a read-write memory to a read-only memory.

Figure 3A:
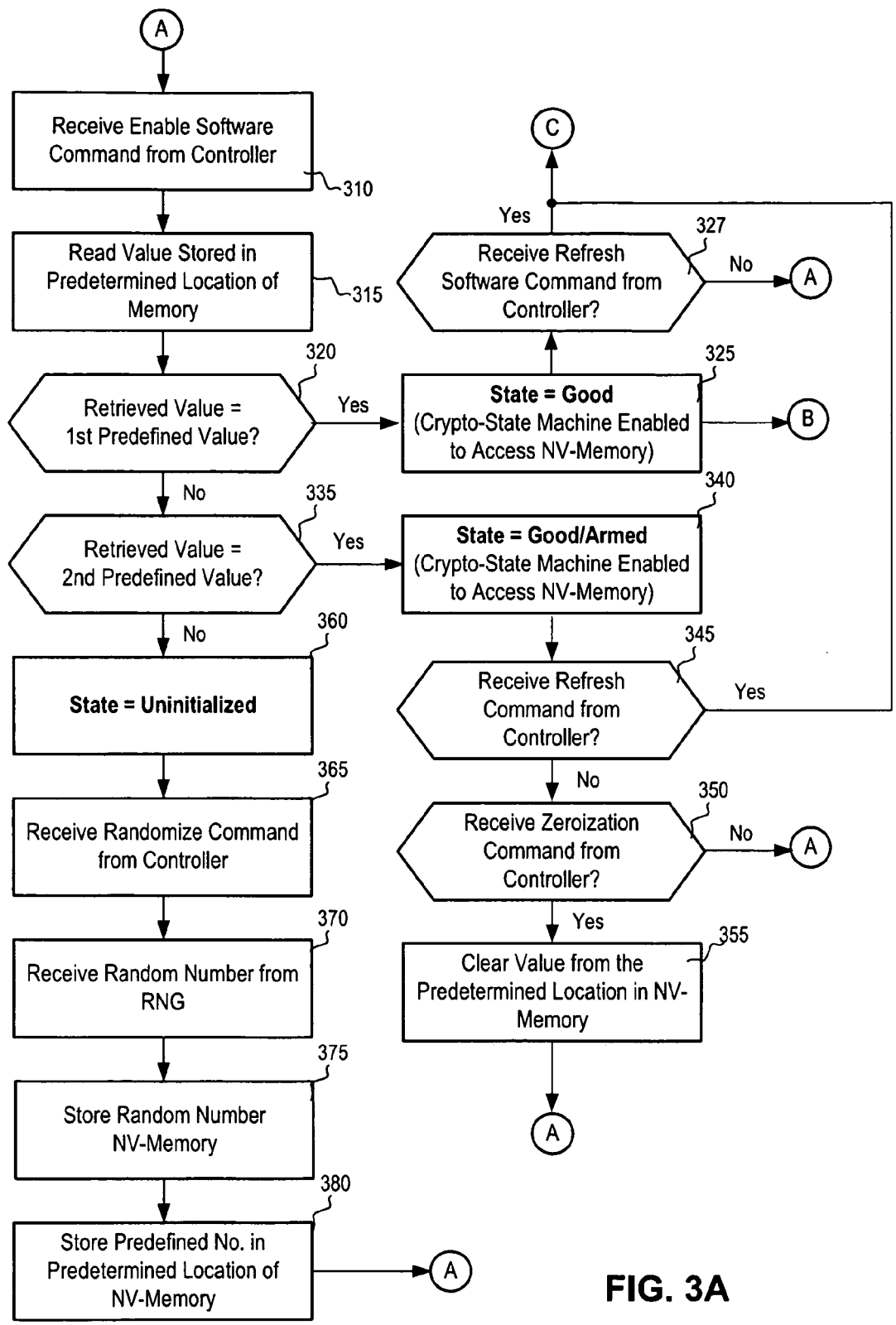
FIGS. 3A and 3B are flow charts illustrating processes performed by an exemplary node.
Figure 3B:
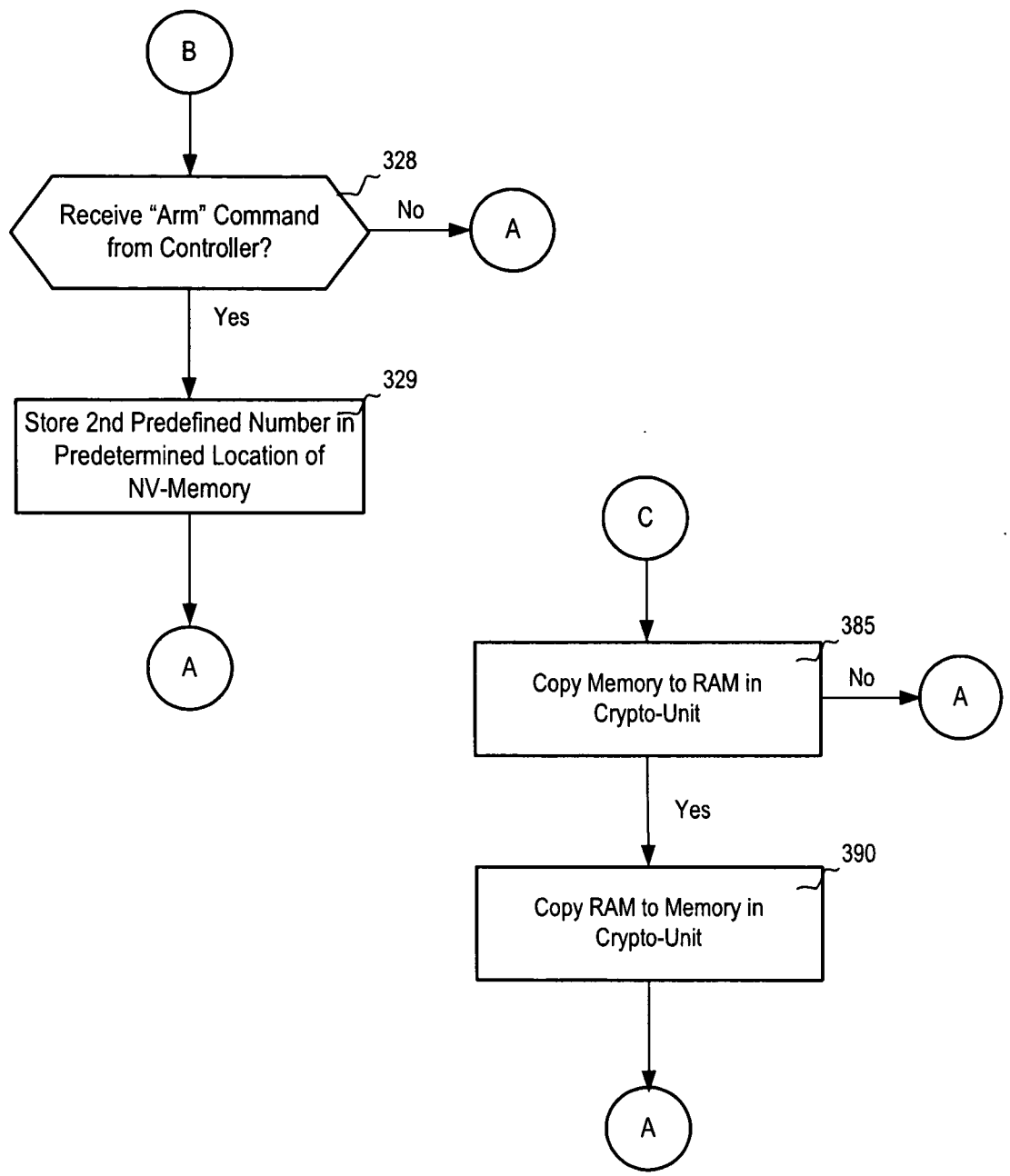

FIGS. 3A and 3B illustrate a flowchart of an exemplary process performed by cryptographic state machine 256. As noted above, cryptographic state machine 256 is comprised of hardware logic that causes cryptographic unit 250 to perform operations preventing changes to the values stored in the non-volatile memory 260 based on the state of cryptographic state machine 256. Cryptographic state machine 256 may receive an enable command from controller 220. (Step 310.) The enable command causes cryptographic state machine 256 to read a value stored in a predetermined "sentinel" location 261 of non-volatile memory 260. (Step 315.) Based on the value stored in sentinel location 261, cryptographic state machine 256 determines whether the non-volatile memory 260 has been programmed with randomized private key information from random number generator 258 or is in an uninitialized (i.e., "virgin") state.

If the retrieved value is equal to a first predefined value (step 320), cryptographic state machine 264 enters a so-called "good" state (step 325). When cryptographic state machine 256 is in the "good" state, information may be accessed by cryptographic interface device 251. (Step 325, yes.) For instance, if cryptographic state machine 256 is in the "good" state, information from the non-volatile memory 260 that corresponds to the type of cryptographic operation being performed is retrievable. Also, when cryptographic state machine 264 is in the "good" state, the machine prevents any changes to the contents of non-volatile memory 260 by controller 220 or cryptographic state machine 256.

In contrast, if cryptographic state machine 256 is not in the "good" state information requested from non-volatile memory 260 is not provided. Instead, for example, cryptographic memory device may provide no information or incorrect information in response to the request. In addition, when cryptographic state machine 256 is in the "good" state, it may be commanded by controller 220 to enter other states.

In one case, when cryptographic state machine 256 is in the "good" state, if an "arm" software command is received by the cryptographic state machine 256 from, for instance, initialization module 286 executed by controller 220 (step 328, yes), cryptographic state machine 256 will store a second predefined number to the predefined, "sentinel" location of non-volatile memory 260 (step 329). Based on this value in the predetermined, "sentinel" location, cryptographic state machine 256 can be armed for subsequent zeroization by controller 220. Otherwise, if an "arm" software command is not received (step 328, no), cryptographic state machine 256 continues to operate in the "good" state pending further commands from controller 220.

When the value read from predetermined, "sentinel" location of non-volatile memory 260, is equal to the second predefined number (step 335, yes), cryptographic state machine 256 will enter the "good/armed" state (step 340). In some embodiments, the second predefined number is the complement of the first predefined number. In this state, as in the "good" state, cryptographic state machine 256 can provide requested information from non-volatile memory 260 and the contents of memory unit 260 are prevented from being changed.

In the "good/armed" state, cryptographic state machine 256 can be zeroized based on a command from processor, for example zeroization module 290, executed by controller 220. (Step 350.) In such case, cryptographic state machine 256 replaces the value stored in the predetermined, "sentinel" location of non-volatile memory 260 with another (not-predefined) value. (Step 355.) In effect, the clearing of the predefined values from the predetermined memory location of non-volatile memory prevents cryptographic state machine from entering a "good" or "good/armed" state. The zeroization function can be used to counter an attack where a previously validated node 110 has its memory overwritten. Zeroization can occur only when both a hardware event and a software event take place. The hardware requirement ensures that there is no software attack where the units in the network 100 can be wiped out through an over-the-air attack.

The initialization may be triggered by processor 220, via zeroization module 290, for example, in response to an indication of tampering, a command from an operator, or based received from another node 110. For instance, tampering may be declared a digital high voltage is set on a certain pin (which is normally in a digital low state) during JTAG access.

When cryptographic state machine 256 is in the "good" state (step 325) or the "good/armed" state (step 340), controller 220, via refresh module 292, may also trigger a "refresh" of the information stored in non-volatile memory 260 (steps 327, 345). During a refresh operation, the information stored in non-volatile memory 260 is copied to another secure memory (not shown) in non-volatile memory 260 (step 385) and, subsequently, copied back to the non-volatile memory device (step 390). Doing so "refreshes" the stored information to ensure that it is not lost over time due to decay and, thereby, prevents the loss of secret keys to extend to operational life of a node 110. The other memory is not accessible from outside non-volatile memory 260

In the case where the value retrieved from the predetermined, "sentinel" location of non-volatile memory 260 does not equal the first or second predefined number (step 335, no), cryptographic state machine 256 enters an "uninitialized" state (step 360). A node 110 in the uninitialized state is treated as a new, virgin node that contains no secret keys in non-volatile memory device 260.

When the state of cryptographic state machine 256 is "uninitialized" and an "initialization" command is received from controller 220 (step 365), cryptographic state machine 256 receives one or more unique, random numbers from random number generator 258 (step 370). For example, the initialization may be triggered by initialization module 286 in response to a command from an operator or received from another node 110.

The received random numbers are then stored in non-volatile memory 260. (Step 375.) In addition, a predefined value is stored in the predetermined location 261 of non-volatile memory 260, allowing cryptographic state machine 256 to subsequently enter a "good" state (step 325) or "good/armed" state (step 340). When non-volatile memory 260 is initialized with unique, secure, random, private keys and a "sentinel number" is set to a predetermined value, cryptographic state machine 256 prevents non-volatile memory 260 from being changed.

Figure 4:
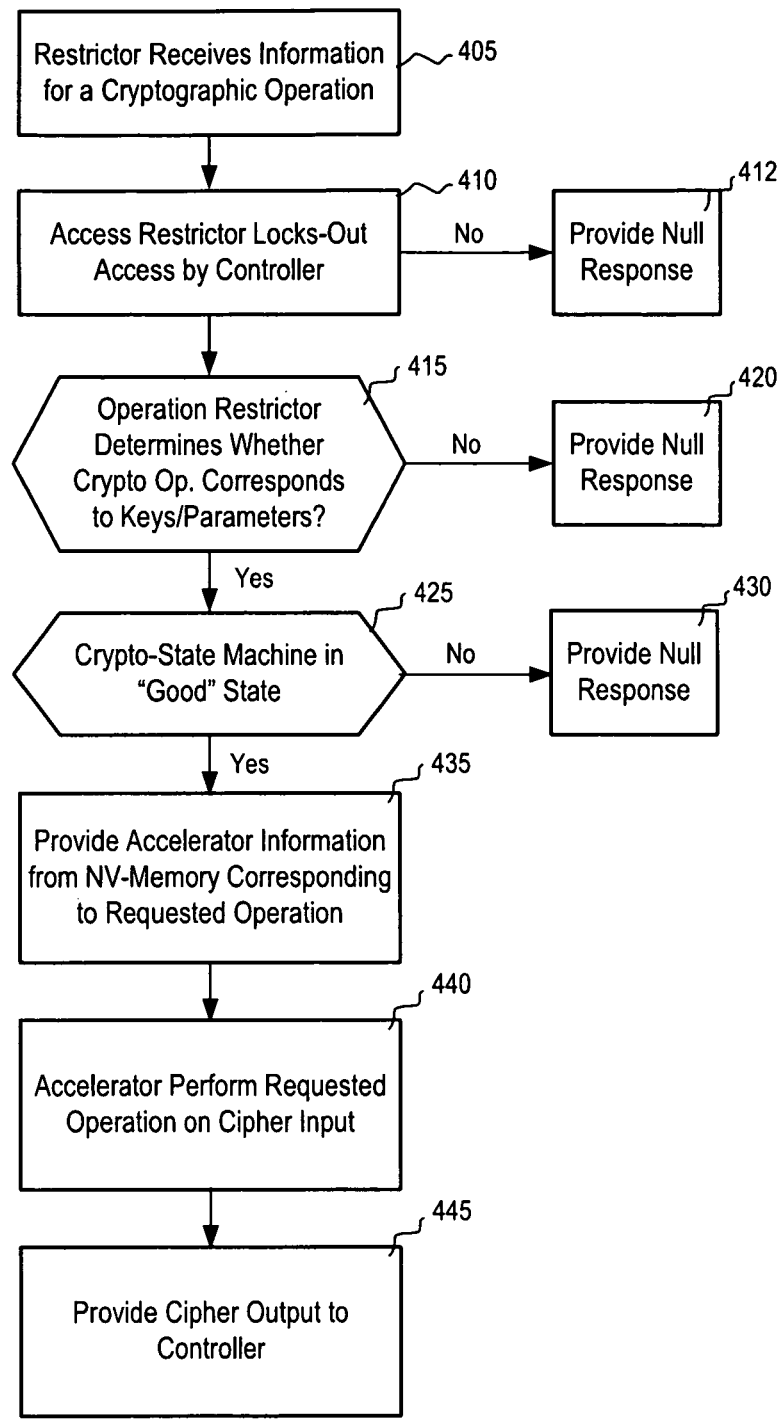
FIG. 4 is a process flow chart illustrating steps performed by an exemplary cryptographic memory device.

FIG. 4 is a flowchart illustrating an exemplary operation of non-volatile memory 260. Restrictor 255 receives information describing a cryptographic operation being requested by controller 220. (Step 405.) This information may be provided by controller 220 and may include one or more of an identifier of the type cryptographic operation being performed and the size of the key required for the operation.

Restrictor 255 locks-out access to non-volatile memory 260 when such request occurs at an improper time or sequence. (Step 410.) For instance, as discussed above, restrictor 255 will deny requests from processor 220 that occur when cryptographic operations are underway by cryptographic accelerator 252. In such case, cryptographic unit 250 provides a null response. (Step 412). A null response may include, for example, a message containing all-zeros and a message with an incorrect or nonsensical response.

Operation restrictor determines whether the cryptographic operation being requested by controller 220 corresponds to the keys and/or parameters requested form the non-volatile memory 260. (Step 415.) If not, cryptographic state machine 256 provides a null response. (Step 420.) If restrictor 255 determines that the cryptographic operation being requested by controller 220 corresponds to the keys and parameters requested (step 415, yes) and if cryptographic state machine 256 is in the "good" state, cryptographic memory device provides the requested keys and parameters from non-volatile memory device 260 to accelerator 252 corresponding to the indicated cryptographic operation being performed by controller 220 (step 435). If not, cryptographic state machine 256 provides a null response. (Step 430). Using the keys and parameters, accelerator 252 performs the requested operation on the input information (step 440) and provides an output response to controller 220 (step 445).

Figure 5:
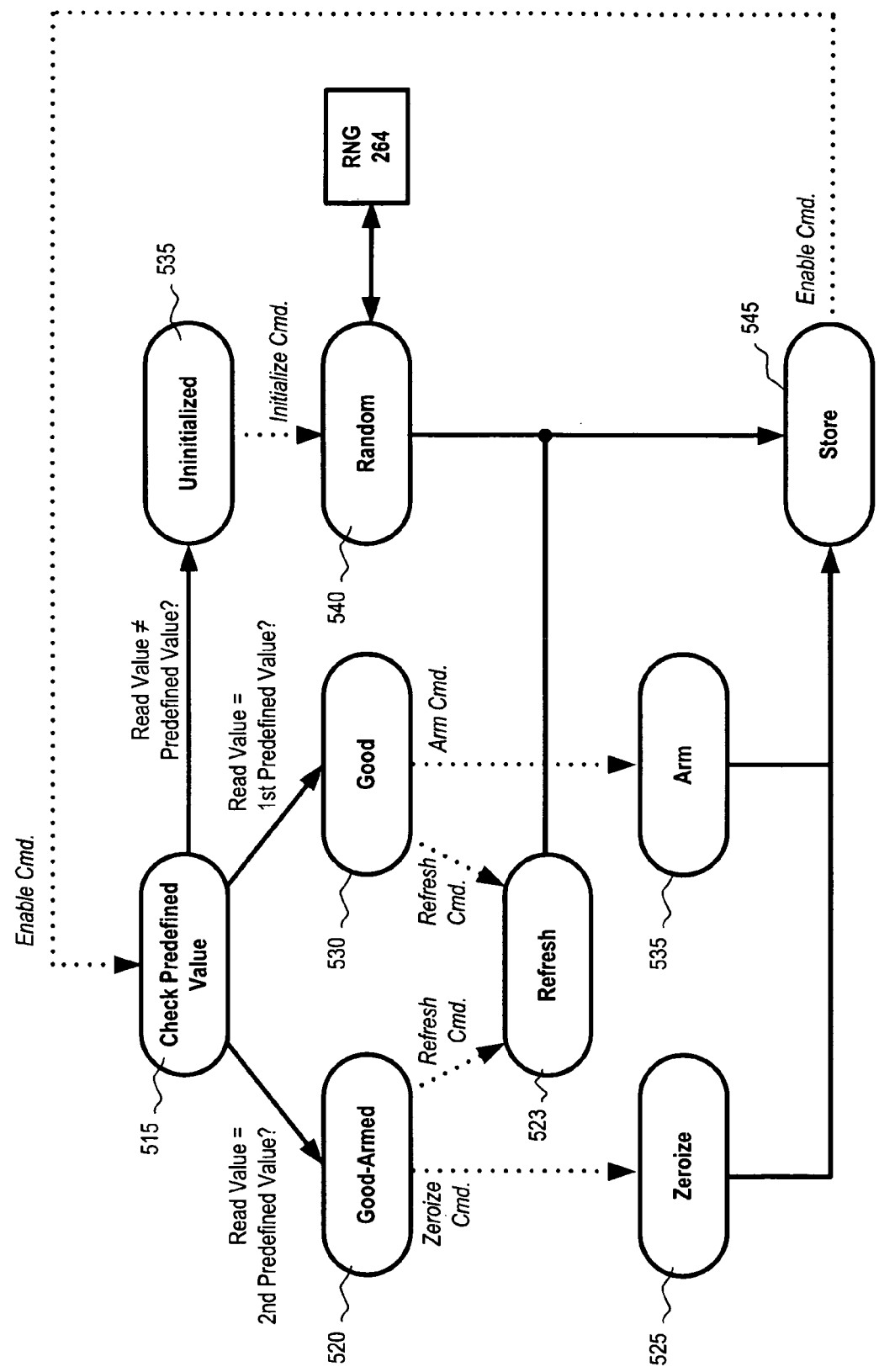
FIG. 5 is a state diagram illustrating states of an exemplary cryptographic memory device.

FIG. 5 illustrates a state diagram for crypto-state machine 256 in accordance with an exemplary embodiment. Crypto-state machine 256 includes a limited number of signals that interface with the software from controller 220 that can trigger cryptographic state machine 256 to enter a different state. All functions performed by cryptographic state machine 256 outside of these are under control of the machine's hardware logic such that the state machine operates autonomously based on internal hardware signals.

Upon receiving an "enable" command from a process executed by controller 220, such as authentication module 288, cryptographic state machine 256 enters "check predefined value" state 515 in which it reads a value stored in predetermined location 261. While in the good state 530, cryptographic state machine 256 prevents accelerator 252 from retrieving information from non-volatile memory device 260.

If the value read from the predetermined, sentinel location 261 is not equal to a predefined value, cryptographic state machine 256 enters an "uninitialized" state 535. In this state, cryptographic state machine 256 is treated as virgin node that does not have secret keys or other information stored in non-volatile memory device 260. While in the uninitialized state 535, cryptographic state machine 256 prevents accelerator 252 from retrieving information from non-volatile memory device 260.

Cryptographic state machine 256 remains in the uninitialized state 535 until a command to which the uninitialized state 535 is response is received from controller 220. If an "initialize" command is received from a process executed by controller 220, such as initialization module 286, while cryptographic state machine 256 is in the uninitialized state 535, machine 256 may enter a "random" state 540. While in the random state 540, cryptographic state machine 256 prevents accelerator 252 from retrieving information from non-volatile memory device 260.

In the random state 540, cryptographic state machine 256 may retrieve random values from RNG 264 and enter a "store" state 545, in which cryptographic state machine 256 stores values in non-volatile memory 260. If another "enable" command is received in the store state 545, cryptographic state machine 256 may return to the check predefined value state 515.

In the check predefined value state 515, if the read value is equal to a first predefined value, cryptographic state machine 256 enters a "good" state 530. While in the good state 530, cryptographic state machine 256 does not prevent accelerator 252 from retrieving information from non-volatile memory device 260.

Cryptographic state machine 256 may remain in the good state 530 until an "arm" command is received from a process executed by controller 220, such as zeroization module 290. While in the arm state 535, cryptographic state machine 256 prevents accelerator 252 from accessing non-volatile memory device 260. In the arm state 540, cryptographic state machine 256 will generate the second predetermined value. The second predetermined value may be, for example, the compliment of the first predetermined value.

From the arm state 540, cryptographic state machine 256 enters the store state 545. While in the store state 545, cryptographic state machine 256 stores the second predetermined value in the predefined sentinel location 261. If another "enable" command is received in the store state 545, cryptographic state machine 256 may return to the check predefined value state 515.

In the check predefined value state 515, if the read value is equal to the second predefined value, cryptographic state machine 256 enters a "good-armed" state 520. While in the good-armed state 520, cryptographic state machine 256 does not prevent accelerator 252 from retrieving information from non-volatile memory device 260. While in the good-armed state 520, if cryptographic state machine 256 receives a "zeroize" command from a process executed by controller 220, such as zeroize module 290. In this state, cryptographic state machine 256 may generate a value, other than the predefined values, and advance to the store state 545, in which the generated value is stored in the predefined, sentinel location 261.

If another "enable" command is received in the store state 545, cryptographic state machine 256 may return to the check predefined value state 515. Since the zeroize command caused the sentinel location 261 to contain a value other than a predefined value, the check predefined value state 515 will subsequently cause cryptographic state machine 256 to enter the uninitialized state 535.

When cryptographic state machine 256 is in either the good-armed state 520 or the good state 230 and a "refresh" command is received from a process executed by controller 220, such as refresh module 292, cryptographic state machine 256 enters a "refresh" state 523. In the refresh state 523, cryptographic state machine 256 causes some or all of the contents of non-volatile memory 260 to be copied another secure memory (not shown) in cryptographic unit 250. Subsequently, cryptographic state machine 256 retrieves the contents of the other memory and enters the store state 545, in which the retrieved information is re-written into non-volatile memory 260. If another "enable" command is received in the store state 545, cryptographic state machine 256 may return to the check predefined value state 515.

As disclosed herein, embodiments and features of the invention can be implemented through computer hardware and/or software. While illustrative embodiments of the invention have been described herein, further embodiments can include equivalent elements, modifications, omissions, combinations (e.g., of aspects across various embodiments), adaptations and/or alterations as would be appreciated by those in the art based on the present disclosure. Other embodiments of the invention will be apparent to those skilled in the art from consideration of the specification and practice of the embodiments of the invention disclosed herein. Further, the steps of the disclosed methods can be modified in various manners, including by reordering steps and/or inserting or deleting steps, without departing from the principles of the invention. It is therefore intended that the specification and embodiments be considered as exemplary only.

What is claimed is:

1. A system comprising:
    a controller including a processor and a memory device having program instructions stored therein that, when executed by the processor, cause the controller to generate a request for a cryptographic operation, said request including one or more descriptors of the cryptographic operation;
    a cryptographic unit communicatively linked to the controller, the cryptographic unit including:
        a random number generator configured to generate random values;
        a non-volatile memory device having values generated by the random number generator stored therein;
        a restrictor device comprised of hardware logic, said restrictor logic causing the restrictor device to prevent access to the values stored in the non-volatile memory device based on a comparison of the one or more descriptors of the requested cryptographic operation with a currently performed cryptographic operation;
        a cryptographic accelerator comprised of hardware logic, the accelerator logic causing the cryptographic accelerator to perform the requested cryptographic operation using one or more of the values stored in the non-volatile memory device that correspond to the requested cryptographic operation; and
        a finite state device comprised of hardware logic, said finite state logic causing the finite state device to enter one of a plurality of states based on a command received from the controller, wherein the states include:
            a first state that (i) allows the cryptographic accelerator to retrieve values stored in the non-volatile memory device and prevents changes to said values when a value stored in a predetermined location of the non-volatile memory device is equal to a first predefined value, and (ii) enables the finite state device to receive a command to enter an arm state in which the finite state device replaces the value stored in the predetermined location of the non-volatile memory device with a second predefined value,
            a second state that (i) allows the cryptographic accelerator to retrieve values stored in the non-volatile memory device and prevents changes to said values when the value stored in the predetermined location of the non-volatile memory device is equal to the second predefined value, and (ii) enables the finite state device to receive a command to enter a zeroize state in which the finite state device replaces the value stored in the predetermined location of the non-volatile memory with a value other than the first and second predefined values, and
            a third state that allows the finite state device to overwrite the values stored in the non-volatile memory device with new values generated by the random number generator stored therein when the value stored in the predetermined location of the non-volatile memory device is not equal to either of the first predefined value or the second predefined value.

2. The system of claim 1, wherein said restrictor logic causes the restrictor device to, based on the one or more descriptors of the requested cryptographic operation, enable the cryptographic accelerator to access values stored in the non-volatile memory device that correspond to the requested cryptographic operation.

3. The system of claim 1, wherein said restrictor logic causes the restrictor device to, based on the one or more descriptors of the requested cryptographic operation, enable the processor to only access a value stored in the non-volatile memory device that corresponds to the requested cryptographic operation.

4. The system of claim 1, wherein the descriptors of the requested cryptographic operation include one or more of a type and a key size.

5. The system of claim 1, wherein the controller and cryptographic unit are included in a node.

6. The system of claim 5, wherein the node is an element of a utility network.

7. The system of claim 1, wherein the finite state device is configured to receive a refresh command if entered into the first state or the second state, and wherein the refresh command causes the finite state device to refresh the values stored in the non-volatile memory device.

8. A memory device comprising a read/write memory and a finite state machine that links the read/write memory to a processor, wherein said finite state machine includes hardware logic that causes the finite state machine to perform the following operations:
retrieve, in response to a command issued by the processor, a value from a predefined location of the read/write memory;
determine whether the retrieved value is equal to a first predefined value, and, when the retrieved value is determined to be equal the first predefined value, enter a first state that (i) allows retrieval of other values stored in the read/write memory and prevents changes to said values, and (ii) enables the finite state machine to receive a command to enter an arm state in which the finite state machine replaces the value in the predefined location of the read/write memory with a second predefined value;
determine whether the retrieved value is equal to the second predefined value, and, when the retrieved value is determined to be equal to the first predefined value, enter a second state that (i) allows retrieval of the other values stored in the read/write memory and prevents changes to said values, and (ii) enables the finite state machine to receive a command to enter a zeroize state in which the finite state machine replaces the value in the predefined location of the read/write memory with a value other than the first and second predefined values; and
determine whether the retrieved value is not equal to either of the first predefined value or the second predefined value, and, when the retrieved value is determined to be not equal to either the first predefined value or the second predefined value, enter a third state that enables the values stored in the read/write memory to be overwritten with values generated by a random number generator, wherein
the command issued by the processor is a request for a cryptographic operation, said request including one or more descriptors of the cryptographic operation, and
the memory device further includes a restrictor that restricts access to said values stored in the read/write memory based on a comparison of the one or more descriptors of the requested cryptographic operation with a currently performed cryptographic operation.

9. The memory device of claim 8, wherein the hardware logic further causes the finite state machine to refresh said other values stored in the read/write memory upon receipt of a refresh command, wherein the refresh command is received by the finite state machine if entered into the first state or the second state.

10. A memory device comprising:
a read/write memory;
a random number generator device; and
a finite state machine that links the read/write memory to a processor, wherein the finite state machine includes hardware logic that causes the finite state machine to enter one of a plurality of states based on a value recorded in a predetermined location of the read/write memory, said states including:
a first state in which (i) the finite state machine enables access to information stored in the read/write memory and prevents changes to said information when the value recorded in the predetermined location of the read/write memory is equal to a first predefined value, and (ii) the finite state machine is enabled to receive a command to enter an arm state in which the finite state machine replaces the value recorded in the predetermined location of the read/write memory with a second predefined value;
a second state in which (i) the finite state machine enables access to said information stored in the read/write memory and prevents changes to said information when the value recorded in the predetermined location of the read/write memory is equal to the second predefined value, and (ii) the finite state machine is enabled to receive a command to enter a zeroize state in which the finite state machine replaces the value recorded in the predetermined location of the read/write memory with a value other than the first and second predefined values; and
a third state in which the finite state machine enables the information stored in the read/write memory to be overwritten with new values generated by the random number generator device when the value recorded in the predetermined location of the read/write memory is not equal to either the first predefined value or the second predefined value.

11. The memory device of claim 10, wherein the hardware logic causes the finite state machine to, based on the value in the predetermined location, enter a state in which the finite state machine enables said value in the predetermined location of the read/write memory device to be overwritten with a different value.

12. The memory device of claim 10, wherein, if the finite state machine is in the first state or the second state, the finite state machine is configured to receive a refresh command, wherein the refresh command causes the finite state machine to refresh the information in the read/write memory.

13. A cryptographic device comprising:
a finite state machine having a plurality of states;
a random number generator device communicatively linked to the finite state machine; and
a read/write memory communicatively linked to the finite state machine, said memory device storing a key value generated by the random number generator and storing a value in a predetermined location of the read/write memory, wherein the finite state machine is configured to
enter a first state in which the finite state machine enables access to information in said read/write memory and prevents changes to said information when the value stored in the predetermined location is equal to a first predefined value and is further configured to receive a command to enter an arm state in which the finite state machine replaces the value stored in the predetermined location of the read/write memory with a second predefined value,
enter a second state in which the finite state machine does not allow access to information in said read/write memory and prevents changes to said information when the value stored in the predetermined location is equal to the second predefined value and is further configured to receive a command to enter a zeroize state in which the finite state machine replaces the value recorded in the predetermined location of the read/write memory with value other than the first and second predefined values, and
enter a third state in which the finite state machine enables the key value stored in the read/write memory to be overwritten with a new key value generated by the random number generator when the value stored in the predetermined location is not equal to either the first predefined value or the second predefined value.

14. The cryptographic device of claim 13, wherein, based on received information describing a cryptographic algorithm being performed, the finite state machine enables the cryptographic device to access information stored in the read/write memory.

15. The cryptographic device of claim 13, wherein, based on received information indicating a cryptographic operation being performed, the finite state machine enables the cryptographic device to only access a value stored in the read/write memory that corresponds to the indicated cryptographic operation.

16. The cryptographic device of claim 13, wherein, when the cryptographic device is performing a cryptographic operation, the finite state machine prevents an external processor from accessing the cryptographic device.

17. The cryptographic device of claim 13, wherein the finite state machine is further configured to receive a refresh command if entered into the first state or the second state, wherein the refresh command causes the finite state machine to refresh the information in said read/write memory.

* * * * *